(12) United States Patent  
Pawar et al.

(10) Patent No.: US 12,107,790 B2
(45) Date of Patent: *Oct. 1, 2024

(54) DYNAMIC BEAM SWEEPING BASED ON CONTENT USAGE

(71) Applicant: T-MOBILE INNOVATIONS LLC, Overland Park, KS (US)

(72) Inventors: Hemanth Pawar, Brambleton, VA (US); Krishna Sitaram, Chantilly, VA (US); Shilpa Kowdley Srinivas, Brambleton, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,384

(22) Filed: Jul. 5, 2023

(65) Prior Publication Data

US 2023/0344587 A1 Oct. 26, 2023

Related U.S. Application Data

(63) Continuation of application No. 16/865,218, filed on May 1, 2020, now Pat. No. 11,736,256.

(51) Int. Cl.
*H04L 5/00* (2006.01)
*H04B 7/0452* (2017.01)

(52) U.S. Cl.
CPC ........... *H04L 5/005* (2013.01); *H04B 7/0452* (2013.01); *H04L 5/0023* (2013.01); *H04L 5/0069* (2013.01)

(58) Field of Classification Search
None
See application file for complete search history.

(56) References Cited

U.S. PATENT DOCUMENTS

| 11,736,256 | B1* | 8/2023 | Pawar | H04L 5/0069 370/330 |
| 2015/0358129 | A1* | 12/2015 | Ryu | H04L 5/0023 455/438 |
| 2016/0143055 | A1 | 5/2016 | Nammi et al. | |
| 2019/0387441 | A1 | 12/2019 | Koskela et al. | |
| 2020/0100131 | A1 | 3/2020 | Yang et al. | |
| 2020/0314826 | A1* | 10/2020 | Sharma | H04W 72/046 |
| 2021/0058917 | A1 | 2/2021 | Abedini et al. | |
| 2021/0376894 | A1 | 12/2021 | Cha et al. | |
| 2022/0346042 | A1* | 10/2022 | Huang | H04W 56/001 |

* cited by examiner

*Primary Examiner* — Diane L Lo
(74) *Attorney, Agent, or Firm* — Shook, Hardy & Bacon L.L.P.

(57) ABSTRACT

Systems and methods are provided for dynamic beam sweeping a synchronization signal based on user device activity. An average synchronization signal transmission periodicity may be modified in response to determinations about the mobility of user devices, in response to determinations about the synchronization sensitivity of content being transmitted to user devices, or both. The modified beam sweeping protocol may responsively increase or decrease the average periodicity of a series of synchronization signals that are transmitted to a distinct portion of a sector using one or more distinct beamforms, increasing the synchronization efficiency of limited synchronization signals being transmitted to the cell.

19 Claims, 5 Drawing Sheets

DYNAMIC BEAM SWEEPING BASED ON CONTENT USAGE

CROSS REFERENCE TO RELATED APPLICATIONS

This application is a continuation of U.S. patent application Ser. No. 16/865,218, filed on May 1, 2020, entitled Dynamic Beam Sweeping Based on Content Usage, and incorporates said application herein by reference.

SUMMARY

The present disclosure is directed, in part, to optimizing the transmission of downlink synchronization signals based on content type used by one or more user devices, substantially as shown in and/or described in connection with at least one of the figures, and as set forth more completely in the claims.

In aspects set forth herein, one or more modified beam sweeping protocols take place in response to determinations or observations about the type of content being used by user devices within a sector. Generally, wireless networks transmit synchronization signals in the downlink in order that user devices are provided with the necessary information for communicating with the network (e.g., timing and channel information). Some networks, such as those implemented in the 5G/NR ecosystem, utilize a technique referred to as beam sweeping, which comprises repeatedly transmitting one or more synchronization signals or signal synchronization blocks to each of a plurality of distinct subsectors within the sector, using a plurality of distinct beamforms with no regard for what type of content is being used by the covered user devices. As such, in times where user devices in a set of one or more subsectors are utilizing network resources of certain content types that indicate lack of mobility or have a lower sensitivity to synchronization, limited downlink synchronization resources may be wasted that could be utilized for higher synchronization-sensitive or high-mobility user devices in other subsectors.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
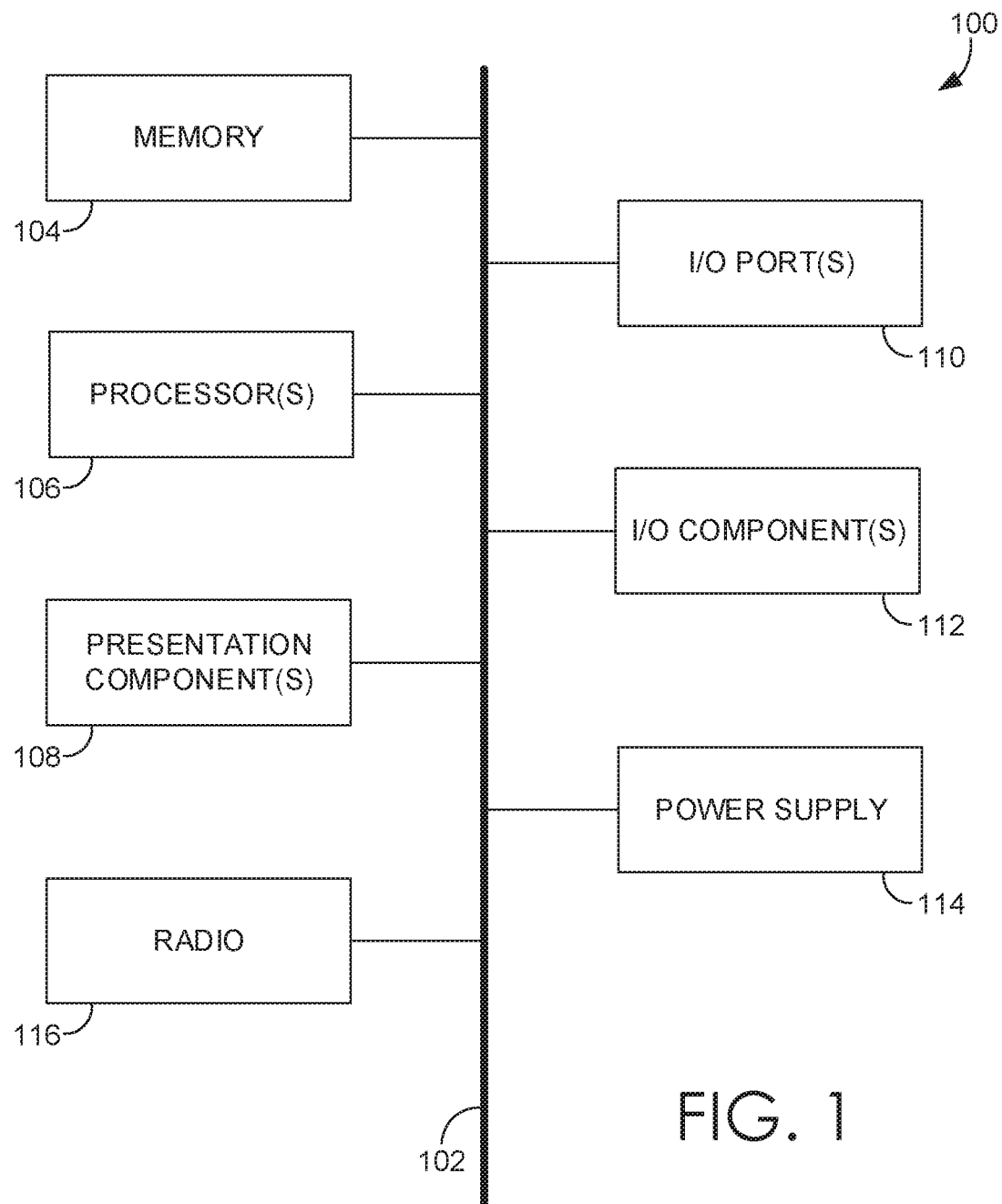
FIG. 1 is a diagram of a computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, is used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

Wireless networks and wireless network protocols include the use of synchronization signals to provide timing and channel information to a user device that is attempting to, or is already connected to, the wireless network. Among other things, the synchronization signals inform the user device when (or on what frequency) to expect downlink transmissions from the network and when (or on what frequency) the user device has been allocated uplink slots. In some wireless protocols, such as the 5G protocol, a limited portion of each 10 ms frame is allocated to transmitting synchronization signals. Further, modern wireless networks, particularly those using increasingly large antenna arrays, utilize beamforming to communicate more precisely, and at higher gain, with user devices located in a particular portion of the sector. In some wireless networks, a beam sweeping procedure is used to transmit one or more synchronization signals to user devices using the benefits of beamforming. In such a network, a sector may be divided into a plurality of distinct subsectors and a distinct beamform may be used to transmit a synchronization signal to each of the distinct subsectors. Because of the limited amount of downlink synchronization resources in each frame and the number of subsectors, in conventional networks, the beam sweeping procedure can only sweep half of the subsectors in each frame; in other words, each subsector only receives a synchronization signal every other frame, or every 20 ms, on average. Conventional networks execute the fixed and recurring beam sweeping procedure with no regard to the type of content being utilized by user devices, meaning that synchronization signals are likely to be transmitted to subsectors that comprise or consist of user devices using network resources for content types that indicates low mobility or having a relatively lower sensitivity to synchronization, inefficiently utilizing limited frame resources.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a system for managing transmission of one or more synchronization signals in a wireless network, the system comprising a node, wherein the node is configured to wirelessly communicate with a set of user devices in a geographic area. The system may also comprise one or more processors configured to perform operations comprising determine a mobility factor for a plurality of user devices in a geographic service area, the plurality of user devices comprising a first set of user devices, and the geographic service area comprising a first portion of the geographic service area and a second portion of the geographic service area, the first portion of the geographic service area being distinct form the second portion of the geographic service area. The operations may additionally comprise determine a location for each user device of the plurality of user devices. The operations may further comprise determine that each user device of the first set of user devices is located within the first portion of the geographic service area. The operations may additionally comprise in response to a determination that the mobility factor for the plurality of user devices is less than a predetermined threshold, modify an average transmission periodicity of a first series of synchronization signals, the first series of synchronization signals transmitted to the first portion of the geographic service area during an optimized time period.

A second aspect of the present disclosure is directed to a method for managing transmission of one or more synchronization signals in a wireless network. The method comprises determining a mobility factor of a first set of user devices, the first set of user devices disposed in a first set of subsectors of a sector. The method further comprises, in response to determining that the mobility factor of the first set of user devices is less than a predetermined threshold, modifying an average transmission periodicity of a first series of synchronization signals, wherein the first set of synchronization signals are transmitted to the first set of subsectors.

According to another aspect of the technology described herein, a non-transitory computer readable media, having instructions stored thereon, that, when executed by one or more processors, cause the one or more processors to carry out a method for dynamic beam sweeping. The method comprises determining a content type of one or more wireless communication sessions, each of the one or more wireless communication sessions being a communication session between each of one or more user devices and a wireless node. The method further comprises determining a synchronization sensitivity of the content type of the one or more wireless communication sessions. The method comprises determining that each of the one or more user devices are located within a first set of subsectors. The method comprises, in response to comparing the synchronization sensitivity of the content type of the one or more wireless communication sessions to a predetermined threshold, modifying an average transmission periodicity of a first series of synchronization signals, wherein the first set of synchronization signals are transmitted to the first set of subsectors.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel.

Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
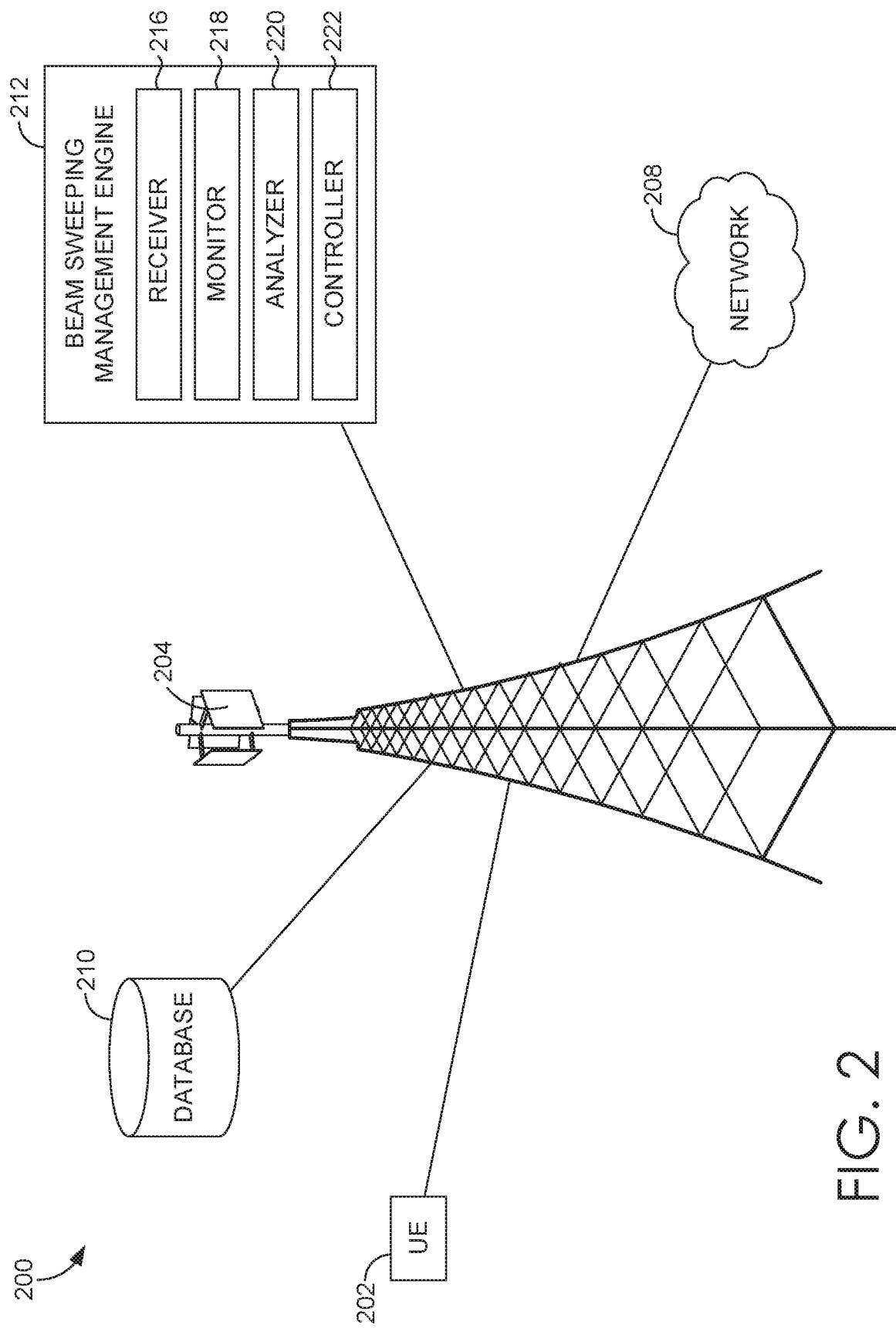
FIG. 2 illustrates a network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a first node 204, network 208, database 210, and beam sweeping management engine 212. In network environment 200, the user device 202 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates with a node of the wireless network, such as the node 204, in order to interact with one or more components of the network 208.

In some aspects, the user device 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 202 may communicate with the node 204 on any one or more frequencies, frequency bands, channels, or the like. Though only the node 204 is depicted in FIG. 2, it should be understood that the user device 202 may be capable of connecting to any one or more of a plurality of nodes, using any one or more of a plurality of communication protocols, on any one or more of a plurality of frequencies.

In some cases, the user device 202 in network environment 200 can optionally utilize network 208 to communicate with other computing devices (e.g., a mobile device(s), a server(s), a personal computer(s), etc.) through the node 204. The network 208 may be a telecommunications network(s), or a portion thereof. A telecommunications network might include an array of devices or components (e.g., one or more base stations, servers, computer processing components), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Network 208 can comprise any one or more communication networks providing voice, SMS, and/or data service(s), such as, for example, a 1x circuit voice, a 3G network (e.g., CDMA, CDMA2000, WCDMA, GSM, UMTS), a 4G network (WiMAX, LTE, HSDPA), or a 5G network.

In some implementations, the first node 204 is configured to communicate with user devices, such as the user device 202 that are located within the geographical area, or cell, covered by the one or more antennas of the first node 204. Said area may be referred to herein as a geographic coverage area, sector, or the like. Though referred to as a node for simplicity, the node 204 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 204 may transmit a variety of downlink signals to the user device 202 in an effort to establish a wireless communication session. Notably, these downlink signals include one or more synchronization signals. As briefly descried above, synchronization signals, as used herein, are meant to refer to any of a variety of particular signals (e.g., a primary synchronization signal (PSS), secondary synchronization signal (SSS), and/or a physical broadcast channel indicator (PBCH)), and/or a block combination of one or more synchronization signals (e.g., a synchronization signal block (SSB) which may comprise a PSS, SSS, and a PBCH). The synchronization signal transmitted from the node 204 to the user device 202 may be used for any beneficial purpose; for example, the synchronization signal may be used to provide channel and timing information that the user device 202 may use to precisely time transmission, guard, and receive action(s). Conversely, when the user device 202 is not regularly provided with synchronization signals, particularly if the user device 202 is in motion, it may not appropriately transmit in the uplink, increasing interference, increasing packet drops, increasing call failure, or any one or more of many different undesirable network conditions.

The synchronization signals transmitted in the downlink by the node 204 may be broadcasted in distinct beamforms that are meant to serve a particular portion of the geographic service area served by the node 204. The geographic service area of the node 204 may be divided into a plurality of subsectors (i.e., coverage area sections). Utilizing advanced antenna arrays (e.g., a massive MIMO array comprising 8, 32, 64, 128 antennas), the node 204 may transmit a plurality of distinct beamforms, each distinct beamform serving a distinct subsector for the purpose of propagating synchronization signals. Further, and as referred to herein, it may be said that the node 204 transmits a series of synchronization signals to each subsector; that is, the node 204 may transmit a first synchronization signal to a first subsector at a first time using a first beamform, and after the node 204 performs a complete iteration of the beam sweeping protocol, the node may transmit a second synchronization signal to the first subsector at a second time using the first beamform. While the first and second synchronization signal may comprise the same or similar information, the term "series" is meant to define the cyclic/periodic transmissions (i.e., the first synchronization signal, the second synchronization signal, etc.) that would be observed/received by a user device in the first subsector (assuming that the user device 202 is not observing/receiving synchronization signals from any of the second or subsequent beamforms that are meant to serve the second or subsequent subsectors).

The node 204 may be in communication with the beam sweeping management engine 212, which comprises various components that are utilized, in various implementations, to perform one or more methods for managing uplink interference in high noise environments. In some implementations, such as the one depicted in FIG. 2, the beam sweeping management engine 212 comprises components including a receiver 216, a monitor 218, an analyzer 220, and a controller 222. However, in other implementations, more or less components than those shown in FIG. 2 may be utilized to carry out aspects of the invention described herein. Though shown as a separate entity, the beam sweeping management engine 212 may take the form of one or more software stacks, modules, applications, etc., may be executed and/or located at a single location or a plurality of locations, and may executed by one or more network components, or may provide instructions for execution at a location remote to the beam sweeping management engine.

The receiver 216 of the beam sweeping management engine 212 is generally responsible for receiving information and/or indications from various network components and/or user devices that may be relevant for making beam sweeping management decisions. For example the receiver 216 may receive one or more indications of a position of a user device, such as the user device 202. The one or more indications of the position of the user device may comprise at least one of a geographic coordinate (i.e., geo-coordinate) and a time that the user device 202 was located at the geographic coordinate. The geographic coordinate may be based on any desirable methodology; for example, the geographic coordinate may be based on or provided by an extra-terrestrial or terrestrial navigation system (e.g., GPS, GLONASS, LORAN, and the like), or it may be based on one or more determinations made by any one or more components of the user device 202, node 204, or network 208, based on information available to them (e.g., network-based location services, triangulation, lines of bearing to a node, time delay location, and the like). The receiver 216 may receive user device position information directly from the user device, or indirectly, via one or more network components 208. In some aspects, the receiver 216 may receive one or more indications from the user device 202 about the content type of the data being communicated between the node 204 and the user device 202. For example, the user device 202 may communicate one or more indications to the receiver 216 that the user device is using wireless network resources to establish/maintain a voice call, a video streaming session, a gaming session, SMS, internet data, or the like. The receiver 216 may communicate the position and/or content information of the user device 202 and any/all other user devices within the geographic service area of the node 204 to one or more of the monitor 218, the analyzer 220, or the controller 222.

The monitor 218 of the beam sweeping management engine 212 is generally responsible for monitoring the position information of the user devices served by node 204 and the content type of network traffic communicated between the node 204 and/or the network 208 and the user device 202. The position monitoring may comprise translating, from the indication received by the receiver 2016, the position information associated with the one or more user devices served by the node 204. The content type monitoring may comprise determining a content type by way of one or more packet sniffers, based on the one or more content type indications communicated to the monitor from the user device 202 by way of the receiver 216, or other any other tool for determining the content of traffic being communicated to the user device 202. The monitor 218 may combine the position information of the one or more user devices and the content type of the network traffic being utilized by the one or more user devices to determine a content-based distribution of the user devices served by the node 204 provide the position, content type, and/or content-based distribution information to any one or more of the analyzer 220 and the controller 222.

The analyzer 220 is generally responsible for determining whether a modified beam sweeping protocol should be executed and, if so, what the modified protocol should comprise. As briefly discussed above, a conventional beam sweeping protocol comprises of transmitting four synchronization signals in every 10 ms frame, with each of the four synchronization signals being transmitted to a distinct subsector using a distinct beamform. Assuming that a coverage area consists of eight subsectors (for synchronization purposes), user devices in the first four swept subsectors will receive one or more synchronization signals during a first frame. Because a limited amount of network resources can be allocated to synchronization, user devices in the other four subsectors must wait for the first frame to conclude; during the second frame, the node will transmit synchronization signals to each of the remaining distinct subsectors using a distinct beamform. In other words, conventional networks will equally, agnostically, and repeatedly transmit synchronization signals to each distinct subsector approximately once every 20 ms. Conventional beam sweeping protocols feature a prescribed pattern of transmitting synchronization signals to a plurality of subsectors in a particular order with a preset periodicity. For example, if a geographic coverage area may be subdivided into eight subsectors; the conventional system may transmit a synchronization signal sequentially (i.e., subsector 1, 2, 3, 4 in the first frame, and 5, 6, 7, and 8 in the second frame), even/odd (i.e., 1, 3, 5, and 7 in the first frame, and 2, 4, 6, and 8 in the second frame), or any other pattern that is agnostic to user device location and/or distribution.

Aspects of the present disclosure include modified beam sweeping protocols that depart from static beam sweeping protocols such as those described above. Based on the user device content-based distributions provided to the analyzer 220 from the monitor 218, the analyzer may determine that subsectors are associated with higher or lower synchronization sensitivity and/or mobility. For example, a first content-based distribution of user devices within the geographic service area associated may be communicated to the analyzer 220. The analyzer 200 may determine that a particular content-based distribution has a synchronization sensitivity and/or mobility factor, based on the content type of the traffic being provided to the user devices of the content-based distribution. For example, the analyzer 220 may determine that a first content type is more sensitive to synchronization (more likely to fail or have errors if synchronization occurs less frequently) or has a higher associated mobility factor (more likely to move from one subsector or cell to another). The analyzer 220 may determine that a first content type (e.g., voice calls) is more sensitive/mobile or determine that a second content type is less sensitive to synchronization or has a lower associated mobility factor (e.g., video streaming). Though described together, the analyzer may either the synchronization sensitivity or the mobility factor, or both, and may take action based on either or both of said determinations. In one aspect, the analyzer 220 may rank-order the subsectors based on the content-based distribution of user devices, in order from the most synchronization sensitive (or having the highest mobility factor) to the least synchronization sensitive (or having the lowest mobility factor). In another aspect, the analyzer 220 may compare the content-based distributions to a predetermined threshold to determine to determine whether a beam sweeping protocol should be modified. The threshold comparison may be positive or negative. In a positive aspect, the analyzer 220 may determine that a sufficiently large number of user devices having a high level of synchronization sensitivity or a high mobility factor are disposed in a first set of subsectors. In a negative aspect, the analyzer 220 may determine that a sufficiently large number of user devices having a low level of synchronization sensitivity or a low mobility factor are disposed in a second set of subsectors. For example, a predetermined percentage (e.g., 50%, 67%, 75%, etc.) of the user devices having a particular synchronization sensitivity or mobility factor in the geographic coverage area are disposed in a predetermined number of subsectors (e.g., ¼, ½, etc.). Whether based on thresholds or rank-ordering, the analyzer may craft a modified beam sweeping protocol that allocates more downlink synchronization signal resources towards highly sensitive or mobile subsectors and/or affirmatively allocates less downlink synchronization signal resources towards low sensitivity or less mobile subsectors.

For example, a modified beam sweeping protocol may equally divide ⅔ of the downlink synchronization signal resources to the half of more sensitive/more mobile subsectors and equally divide ⅓ of the downlink synchronization signal resources to the less sensitive/less mobile subsectors. Other distributions may be utilized; for example, and assuming the geographic coverage area is divided into eight subsectors, downlink synchronization signal resources could be allocated in a linear ratio (e.g., x for the least sensitive/least mobile, 2x for the second least, . . . 8x for the greatest), exponential (e.g., x for the least sensitive/least mobile, 2x for the second lowest, 4x for the third lowest, etc.), or any other desirable pattern. Alternatively, if, for example, the analyzer 220 determines that all of the user devices in the geographic service area are disposed in a first set of subsectors, the analyzer 220 may entirely cease transmission of synchronization signals to the vacant subsectors and allocate the foregone downlink synchronization resources to the more sensitive/mobile of the occupied subsectors (i.e., increasing transmission periodicity from 20 ms to 10 ms by transmitting the synchronization signals to the higher-density subsectors in each frame) or, if the transmission to the occupied subsectors is unchanged, the analyzer may simply transmit fewer overall synchronization signals by not transmitting them to the vacant subsectors.

In another aspect, the modified beam sweeping protocol may be created in response to a determination that one or more subsectors are below a predetermined sensitivity and/or mobility threshold. If few enough (e.g., 0%, 5%, 10%, 25%, etc.) user devices are determined to be distributed, based on an indication from the monitor 218, in a threshold number of subsectors (e.g., ¼, ½, etc.) and that few enough (e.g., less than 50%, 25%, 10%, 5%, or none at all) user devices have a high mobility factor and/or high synchronization sensitivity, the analyzer 220 may consider said subsectors to be low impact for increasing synchronization periodicity and accordingly determine that fewer downlink synchronization resources need to be transmitted to said one or more subsectors. Assuming that no other triggering conditions are met, the analyzer 220 may instruct the controller 222 to not broadcast any synchronization signals in the time/frequency slots freed up based on the increase in synchronization signal transmission periodicity (thus, saving power and network resources). In yet another aspect, a modified beam sweeping protocol may be created in response to determining that a greater than threshold number (e.g., greater than 0%, 50%, 75%, 90%) of user devices in a first set of user devices disposed in a first area have a high mobility factor and/or synchronization sensitivity and that a less than threshold number of user devices in a second set of user devices disposed in a second area have a low mobility factor and/or synchronization sensitivity. The analyzer 220 may determine that a modified beam sweeping protocol should be executed that will allocate more downlink synchronization signal resources to the first set of subsectors and correspondingly less downlink synchronization signal resources to the second set of subsectors.

The controller 222 may receive an indication from one or more of the receiver 216, the monitor 218, or the analyzer 220. If it has been determined that a modified beam sweeping protocol should be executed, the controller 222 will receive an indication of what the modified beam sweeping protocol will comprise and the corresponding time period. In response, the controller 222 may communicate one or more indications to the network 208 and/or the node 204 that will cause the node 204 or any one or more components in communicative connection with the node 204 to execute the modified beam sweeping protocol determined by the analyzer 220. At the conclusion of the corresponding time period, or based on an observed user device distribution that deviates from the usage pattern that premised the modified beam sweeping protocol, the modified beam sweeping protocol will conclude and the node 204 will revert to a conventional (e.g., sequential, odd/even) beam sweeping protocol or, if the beginning of a second time period that corresponds to a second modified beam sweeping protocol abuts the conclusion of the concluding protocol, the controller 222 may cause the direct transition from the first beam sweeping protocol to the second beam sweeping protocol.

Figure 3A:
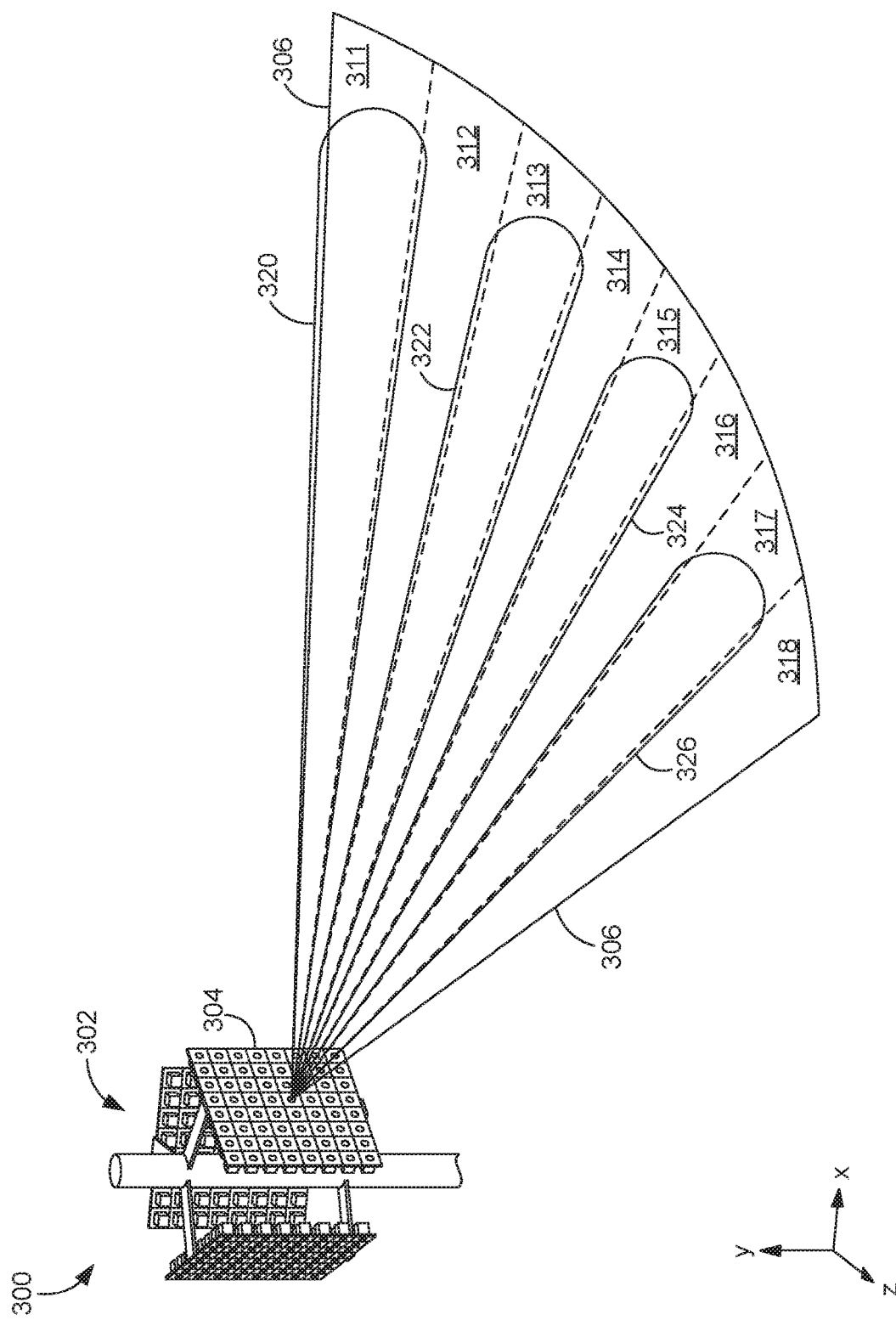
FIGS. 3A-3B depict a representation of a wireless network in which one or more aspects of the present disclosure may be carried out.
Figure 3B:
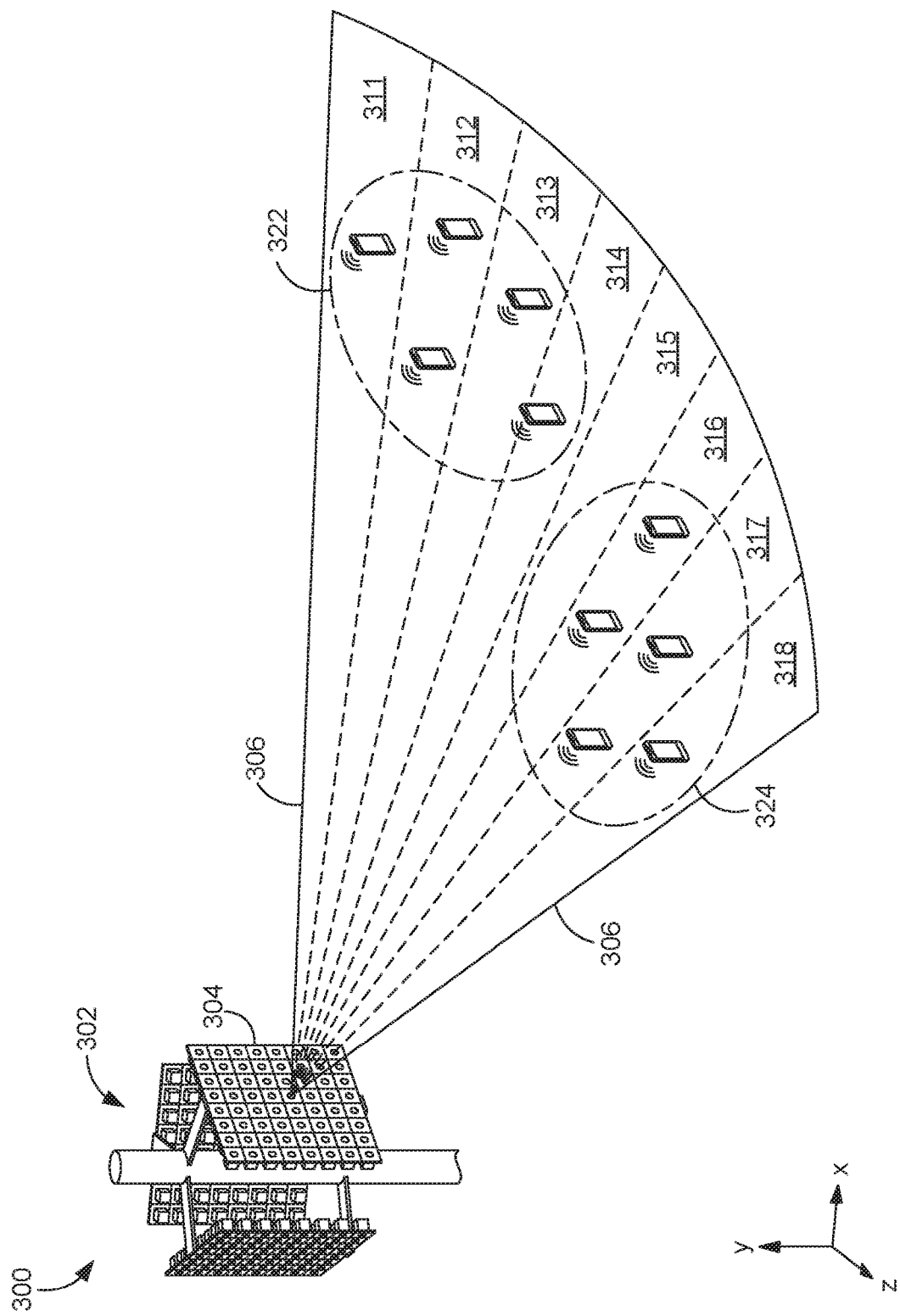

Turning now to FIGS. 3A-3B, a representation of a wireless network is provided that illustrates how a dynamic beam sweeping system in accordance with aspects herein may be carried out. The representation is but one example of a suitable configuration and are not intended to suggest any limitations as to the scope of use or functionality of embodiments described herein. Neither should the configuration be interpreted as having any dependency or requirement relating to any one or combination of components discussed herein with respect to FIGS. 2-4. FIGS. 3A-B illustrate a system 300 comprising a cell 302. The cell 302 may comprise any one or more components of the beam sweeping management engine 212 and the network 208 of FIG. 2 and is communicatively coupled to or may be said to comprise an antenna array 304. Though shown as a massive MIMO array having 64 transmit and 64 receive elements, the antenna array 304 may be any configuration that is suitable for transmitting a plurality of distinct beam forms. The antenna array 304 is generally configured to provide wireless telecommunication services for user devices within a sector, or geographic service area 306. For the purposes of beam sweeping synchronization signals, the geographic service area 306 is functionally divided into a plurality of distinct subsectors 311-218 (though the subsectors 311-318 are shown as discrete (i.e., mutually exclusive or non-overlapping), the usage of the term "distinct" is meant to describe a condition where a first subsector 311 and an adjacent second subsector 312 encompass different geographic areas, whether or not the first subsector 311 and the second subsector 312 have at least some overlap).

The antenna array 304 is configured to transmit a synchronization signal to each of the subsectors 311-318 using a distinct beamform. That is, a first beamform 320 used to transmit a synchronization signal to the first subsector 311 is distinct from a second beamform 322, which is used to transmit a synchronization signal to a third subsector 313. In conventional operating mode (even/odd protocol, for example), the antenna array 304 may execute a normal beam sweeping protocol wherein the first beamform 320 is used to transmit a first synchronization signal to the first subsector 311 in a first set of OFDM symbols of a first frame. Subsequently, the second beamform 322 is used to transmit a second synchronization signal to the third subsector 313 in a second set of OFDM symbols of the first frame. The protocol will advance to similarly transmit a third synchronization signal via a third beamform 324 to the fifth subsector 315 in a third set of OFDM symbols of the first frame and a fourth synchronization signal via a fourth beamform 326 to the seventh subsector 317 in a fourth set of OFDM symbols of the first frame. Following the transmission of synchronization signals to the odd subsectors 311, 313, 315, and 317, the antenna array will send a fifth, sixth, seventh, and eighth synchronization signal to the second, fourth, sixth, and eighth subsectors, using a fifth, sixth, seventh, and eighth beamform, respectively. Notably, the even subsector beams sweeping will take place in a first, second, third, and fourth set of OFDM symbols of a second frame, wherein the second frame is subsequent to and discrete from the first frame. Following the even subsector beam sweeping in the second frame, the odd subsector beam sweeping will repeat in a third frame, wherein the third frame is subsequent to and discrete from each of the first and the second frame. The synchronization signal transmitted to the first subsector in the first frame and the synchronization signal transmitted to the first subsector in the third frame are referred to herein as a series, wherein the series in the conventional protocol has a periodicity of 20 ms.

Turning to FIG. 3B, the system 300 may execute a modified beam sweeping protocol in response to determinations about the content type being used by one or more user devices. Within the geographic service area 306, one or more user devices may be disposed in each of a first area 322 and a second area 324; for example, the first area 322 may comprise a single user device or a plurality of user devices comprising a first set of user devices dispose in any one or more subsectors that may be considered to define a first set of subsectors (e.g., subsectors 311-314). Similarly, the second area 324 may comprise a single user device or a plurality of user devices comprising a second set of user devices disposed in any one or more subsectors that may be considered to define a second set of subsectors (e.g., 315-318), wherein the second set of subsectors may be distinct or discrete from the first set of subsectors. In one of many possible scenarios, and for exemplary purposes only, the system 300 may comprise one or more user devices in the first area 322, wherein one or more components described with respect to FIG. 2 determine that the one or more user devices in the first area 322 are requesting wireless network resources to establish/maintain voice calls and that the one or more user devices in the second area 324 are requesting wireless network resources to establish/maintain a video streaming session. Combining the user device content type and the positions of the user devices within the geographic service area 306, the system determines a content-position distribution. Based on a determination (or based on standing instructions/rules) that user devices engaged in voice calls are more likely to be mobile than user devices engaged in video streaming (and/or that voice calls have a higher sensitivity to synchronization failures than the video streaming), the system 300 may decrease the average transmission periodicity (i.e., transmit more frequently) of a first series of synchronization signals to the first area 322 and increase the average transmission periodicity (i.e., transmit less frequently) of a second series of synchronization signals to the second area 324. In a variation of the preceding example, the system 300 may determine that the first area 322 does not comprise any user devices, and that all of the user devices in the second area 324 are still engaged in video streaming. As a result, the system 300 may still decrease the average transmission periodicity of the second series of synchronization signals but may also decrease the average transmission periodicity of the first series of synchronization signals transmitted to the first area 322. These are but two exemplary scenarios; one skilled in the art would understand that many other scenarios would result in many different outcomes, utilizing the technology described herein.

Figure 4:
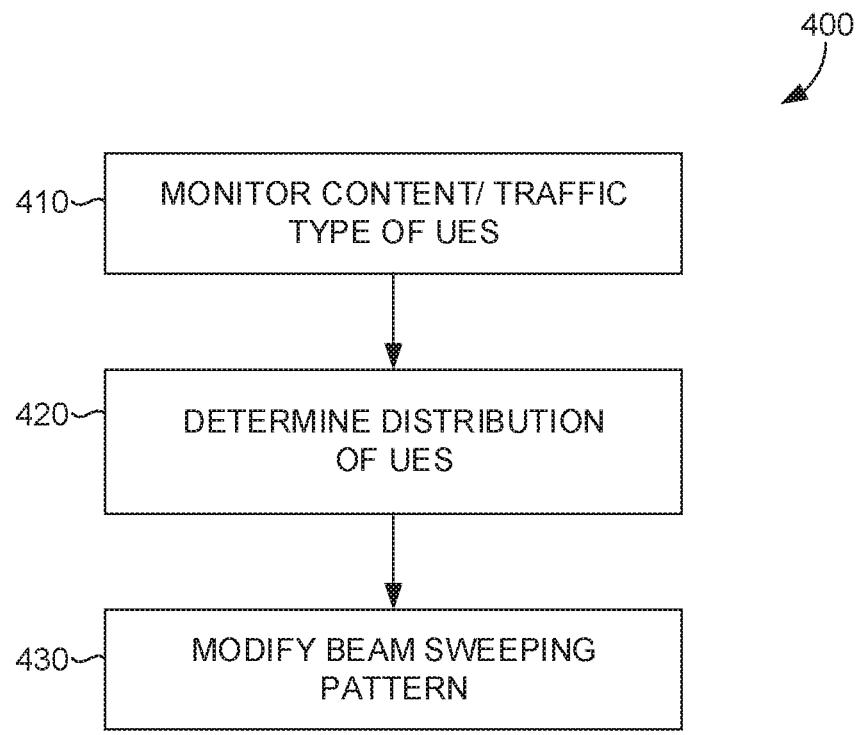
FIG. 4 is a flow diagram of one aspect of a method for dynamic beam sweeping based on network usage patterns, in accordance with implementations of the present disclosure.

FIG. 4 depicts a flow diagram of an exemplary method 400 for dynamic beam sweeping based on content type. At step 410, a content type of information being communicated to one or more UEs is determined. Said determination may be made by monitoring the content or traffic type of information communicated in the downlink to the one or more UEs or based on an indication of UE activity communicated to the network, substantially as described with respect to one or more components of FIGS. 2-3B. The method 400 may proceed to step 420 and determine a distribution of the one or more UEs within a geographic service area, served by one or more wireless nodes, in order to determine a location/content pairing that may be used to determine a particular subsector or set of subsectors' sensitivity to synchronization sweeping changes, utilizing any one or more of the methodologies described with respect to FIGS. 2-3B. At step 430 the beam sweeping pattern is modified to execute the modified beam sweeping protocol during a distinctly later time period that corresponds to the time period of the determined user device distribution. At the conclusion of the relevant time period, or upon the detection of a condition that sufficiently deviates from the determined distribution, the method 400 may revert from the modified beam sweeping protocol to a conventional (e.g., sequential or even/odd) beam sweeping protocol, or, if abutting a second, distinct time period, transition to a second modified beam sweeping protocol.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for managing transmission of one or more synchronization signals in a wireless network, the system comprising:
   a node, the node configured to wirelessly communicate with a set of user devices in a geographic service area; and
   one or more processors configured to perform operations comprising:
   determining a mobility factor for a plurality of user devices in a geographic service area, and the geographic service area comprising a first portion of the geographic service area and a second portion of the geographic service area, the first portion of the geographic service area being distinct from the second portion of the geographic service area, wherein the mobility factor for the plurality of user devices represents a likelihood of each user device of the plurality of user devices to move within the geographic service area;
   determining that each user device of a first set of user devices of the plurality of user devices is located within the first portion of the geographic service area;
   based on a comparison of the mobility factor for the first set of user devices to one or more predetermined thresholds, determining a first synchronization signaling periodicity for the first portion of the geographic area; and
   transmitting, from the node to the first portion of the geographic service area, a first series of synchronization signals to the first portion of the geographic area with the first synchronization signaling periodicity, wherein the first synchronization signaling periodicity is greater than a default synchronization signaling periodicity based on a determination that the mobility factor for the first set of user devices is less than a first predetermined threshold of the one or more predetermined thresholds.

2. The system of claim 1, wherein the first synchronization signaling periodicity is less than the default synchronization signaling periodicity based on a determination that the mobility factor for the first set of user devices is greater than a second predetermined threshold of the one or more predetermined thresholds.

3. The system of claim 2, wherein the first synchronization signaling periodicity is the default synchronization signaling periodicity based on a determination that the mobility factor for the first set of user devices is between the first predetermined threshold and the second predetermined threshold.

4. The system of claim 3, wherein the mobility factor for the first set of user devices represents a likelihood of each user device of the first set of user devices to move within the first portion of the geographic service area.

5. The system of claim 3, wherein the mobility factor for the first set of user devices represents a likelihood of each user device of the first set of user devices to move from the first portion of the geographic service area to the second portion of the geographic service area.

6. The system of claim 3, wherein the first set of user devices consists of zero user devices.

7. The system of claim 3, wherein a second set of synchronization signals are communicated to a second portion of the geographic services area with a second synchronization signaling periodicity.

8. The system of claim 7, wherein the second synchronization signaling periodicity is greater than the first synchronization signaling periodicity based on a determination that a mobility factor for a second set of user devices located in the second portion of the geographic service area is less than the mobility factor for the first set of user devices located in the first portion of the geographic service area.

9. The system of claim 1, wherein the mobility factor is determined based on monitoring a content type of downlink traffic communicated from the node to the plurality of user devices.

10. A method for managing synchronization signaling in a wireless telecommunication environment, the method comprising:
    determining a content type of one or more wireless communication sessions, each of the one or more wireless communication sessions being a communication session between each of one or more user devices and a wireless node;
    determining a synchronization sensitivity of the content type of the one or more wireless communication sessions;
    determining that each of the one or more user devices are located within a first set of subsectors; and
    in response to comparing the synchronization sensitivity of the content type of the one or more wireless communication sessions to a predetermined threshold, modifying an average transmission periodicity of a first series of synchronization signals, wherein the first set of synchronization signals are transmitted to the first set of subsectors.

11. The method of claim 10, wherein the modifying the average transmission periodicity of a first series of synchronization signals comprises increasing the average transmission periodicity.

12. The method of claim 11, further comprising modifying an average transmission periodicity of a second set of synchronization signals transmitted to a second set of subsectors based on synchronization sensitivity of a second set of user devices located in the second set of subsectors.

13. The method of claim 10, wherein the modifying the average transmission periodicity of a first series of synchronization signals comprises decreasing the average transmission periodicity.

14. The method of claim 10, wherein modifying the average transmission periodicity of the first series of synchronization signals is further based on a comparison of a mobility factor of the one or more wireless communication sessions to one or more predetermined thresholds, and wherein the mobility factor represents a likelihood of each user device of the plurality of user devices to move within a geographic service area served by the wireless node.

15. A system for managing synchronization signaling in a wireless telecommunication environment, the system comprising:
one or more antennas of a base station configured to transmit synchronization signals to a geographic area; and
one or more computer processing components communicatively coupled to the one or more antennas and configured to perform operations comprising:
determine a content type of one or more wireless communication sessions, each of the one or more wireless communication sessions being a communication session between each of one or more user devices and the base station;
determining a synchronization sensitivity of the content type of the one or more wireless communication sessions;
determining that each of the one or more user devices are located within a first portion of the geographic area; and
in response to comparing the synchronization sensitivity of the content type of the one or more wireless communication sessions to a predetermined set of rules, modifying an average transmission periodicity of a first series of synchronization signals, wherein the first set of synchronization signals are transmitted to the first portion of the geographic area.

16. The system of claim 15, wherein modifying the average transmission periodicity of a first series of synchronization signals comprises increasing the average transmission periodicity.

17. The system of claim 15, wherein modifying the average transmission periodicity of a first series of synchronization signals comprises increasing the average transmission periodicity.

18. The system of claim 15, wherein modifying the average transmission periodicity of the first series of synchronization signals is further based on a comparison of a mobility factor of the one or more wireless communication sessions to one or more predetermined thresholds, and wherein the mobility factor represents a likelihood of each user device of the plurality of user devices to move within a geographic service area served by the wireless node.

19. The system of claim 15, wherein the one or more computer processing components are further configured to modify an average transmission periodicity of a second set of synchronization signals transmitted to a second set of subsectors based on synchronization sensitivity of a second set of user devices located in the second set of subsectors.

* * * * *